United States Patent
Park et al.

(10) Patent No.: US 9,688,131 B2
(45) Date of Patent: Jun. 27, 2017

(54) POWERTRAIN OF HYBRID VEHICLE

(71) Applicant: Hyundai Motor Company, Seoul (KR)

(72) Inventors: Tae Sic Park, Busan (KR); Seong Eun Park, Gwangmyeong-si (KR); Jun Hoi Huh, Hanam-si (KR); Kwang Min Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 281 days.

(21) Appl. No.: 14/555,280

(22) Filed: Nov. 26, 2014

(65) Prior Publication Data
US 2016/0082823 A1 Mar. 24, 2016

(30) Foreign Application Priority Data

Sep. 23, 2014 (KR) .................. 10-2014-0126854

(51) Int. Cl.
| | |
|---|---|
| B60K 6/365 | (2007.10) |
| B60K 6/383 | (2007.10) |
| B60K 6/442 | (2007.10) |
| B60K 6/52 | (2007.10) |
| B60K 6/448 | (2007.10) |
| B60K 6/38 | (2007.10) |

(52) U.S. Cl.
CPC .............. *B60K 6/365* (2013.01); *B60K 6/383* (2013.01); *B60K 6/442* (2013.01); *B60K 6/448* (2013.01); *B60K 6/52* (2013.01); B60K 2006/381 (2013.01); Y02T 10/6234 (2013.01); Y02T 10/6265 (2013.01); Y10S 903/91 (2013.01); Y10S 903/913 (2013.01); Y10S 903/916 (2013.01)

(58) Field of Classification Search
None
See application file for complete search history.

(56) References Cited

U.S. PATENT DOCUMENTS

| | | | |
|---|---|---|---|
| 2007/0249461 A1* | 10/2007 | Tsuji .................. | B60K 1/02 477/3 |
| 2008/0004780 A1* | 1/2008 | Watanabe .............. | B60K 6/365 701/54 |
| 2014/0051546 A1* | 2/2014 | Maruyama ............. | B60K 6/442 477/5 |

FOREIGN PATENT DOCUMENTS

| | | |
|---|---|---|
| JP | 2004-108167 A | 4/2004 |
| KR | 10-2006-0087412 A | 8/2006 |
| KR | 10-2013-0051052 A | 5/2013 |
| KR | 10-1416422 B1 | 7/2014 |

* cited by examiner

*Primary Examiner* — Edwin A Young
(74) *Attorney, Agent, or Firm* — Morgan Lewis & Bockius LLP

(57) ABSTRACT

A powertrain of a hybrid vehicle may include a planetary gear set, a first motor unit and a second motor unit. The planetary gear set may include three rotary members in which one rotary member is connected to an engine and another rotary member is connected to a front driveshaft. The first motor unit is connected to the remaining rotary member in the three rotary members, and the second motor unit is connected to a rear driveshaft and supplying power to the rear driveshaft.

13 Claims, 8 Drawing Sheets

POWERTRAIN OF HYBRID VEHICLE

CROSS REFERENCE TO RELATED APPLICATION

The present application claims priority of Korean Patent Application Number 10-2014-0126854 filed on Sep. 23, 2014, the entire contents of which application are incorporated herein for all purposes by this reference.

BACKGROUND OF THE INVENTION

Field of the Invention

The present invention, in general, relates to a powertrain of a hybrid vehicle, and, more particularly, to a powertrain of a hybrid vehicle that can implement various driving modes, using a combination of a planetary gear and a clutch.

Description of the Related Art

Hybrid vehicles, which are driven by efficiently combining two different kinds of driving sources, generally use an engine and a motor generator.

Those hybrid vehicles using an engine having a good torque feature at a high speed and a motor generator having a good torque feature at a low speed are driven mainly by the power from the motor generator for low-speed driving and mainly by the power from the engine for high-speed driving.

Further, hybrid vehicles maintain sufficient driving power with high fuel efficiency while they run under various driving conditions, by efficiently combining the power from the engine and the power from the motor generator.

Hybrid powertrains that are used for the hybrid vehicles are designed to appropriately combine the power from an engine and the power from a motor generator. However, the hybrid powertrains require a large number of parts to drive a vehicle in various driving modes such as an EV mode and an HEV mode, so the manufacturing cost increases.

Therefore, there is a need for an efficient powertrain capable of reducing the number of parts of hybrid powertrains and of implementing various driving modes according to the driving conditions of a vehicle.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the related art and/or other problems, and the present invention is intended to provide a powertrain of a hybrid vehicle that can provide various driving modes for driving a hybrid vehicle and allow for efficient driving in accordance with various driving conditions.

According to various aspects of the present invention, there is provided a powertrain of a hybrid vehicle that includes: a planetary gear set including three rotary members in which one rotary member is connected to an engine and another rotary member is connected to a front driveshaft; a first motor unit connected to the remaining rotary member in the three rotary members; and a second motor unit connected to a rear driveshaft and supplying power to the rear driveshaft.

The planetary gear set may include a sun gear, a carrier, and a ring gear.

The first motor unit may be connected to the sun gear of the planetary gear set, the engine may be connected to the carrier, and the front driveshaft may be connected to the ring gear.

The powertrain may further include: a first clutch disposed between the rotary member connected to the first motor unit and the rotary member connected to the engine, in the planetary gear set; and a second clutch disposed between the front drive shaft and the rotary member connected to the front driveshaft, in the planetary gear set, in which a driving mode may change in accordance with engagement states of the first clutch and the second clutch.

In an EV 1 driving mode, the first clutch may be disengaged, the second clutch may be engaged, and the first motor unit may be operated, so that the vehicle may be driven by front wheels operated by power from the first motor unit.

In an EV 2 driving mode, the first clutch and the second clutch may be disengaged and the second motor unit may be operated, so that the vehicle may be driven by rear wheels operated by power from the second motor unit.

In an EV 3 driving mode, the first clutch may be disengaged, the second clutch may be engaged, and the first motor unit and the second motor unit may be operated, so that the vehicle may be driven by four wheels operated by power from the first motor unit and the second motor unit.

In an HEV 1 driving mode, the first clutch may be engaged, the second clutch may be disengaged, and the engine may be operated, so that the first motor unit may generate electricity, using power from the engine, the second motor unit may be operated, and the vehicle may be driven by rear wheels operated by power from the second motor unit.

In an HEV 2 driving mode, the first clutch may be disengaged, the second clutch may be engaged, and the engine and the second motor unit may be operated, so that the vehicle may be driven by four wheels operated by power from the engine and the second motor unit.

In the HEV 2 driving mode, the first motor unit may also be operated in accordance with a driving state of the vehicle, so that power from the first motor unit may be transmitted to the front driveshaft together with power from the engine.

In an HEV 3 driving mode, the first clutch and the second clutch may be engaged, and the engine and the second motor unit may be operated, so that the vehicle may be driven by four wheels operated by power from the engine and the second motor unit.

The powertrain may further include a brake selectively restricting the rotary member connected to the first motor unit, in the planetary gear set, in which in an HEV 4 driving mode, the first clutch may be disengaged, the second clutch and the brake may be engaged and operated, respectively, and the engine and the second motor unit may be operated, so that the vehicle may be driven by four wheels operated by power from the engine and the second motor unit.

A motor clutch may be disposed between the second motor unit and the rear driveshaft.

A one-way clutch may be disposed between the engine and the planetary gear set.

The powertrain of a hybrid vehicle of the present invention can provide various driving modes for driving a vehicle, so it enables a vehicle to run efficiently in accordance with various driving conditions.

In particular, a loss of power through the powertrain is minimized in front-wheel or rear-wheel driving by controlling a planetary gear set and a plurality of clutches and it is possible to achieve both an EV mode and regenerative braking, using all of the motors provided for the front wheels and the rear wheels, so that energy efficiency is high.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
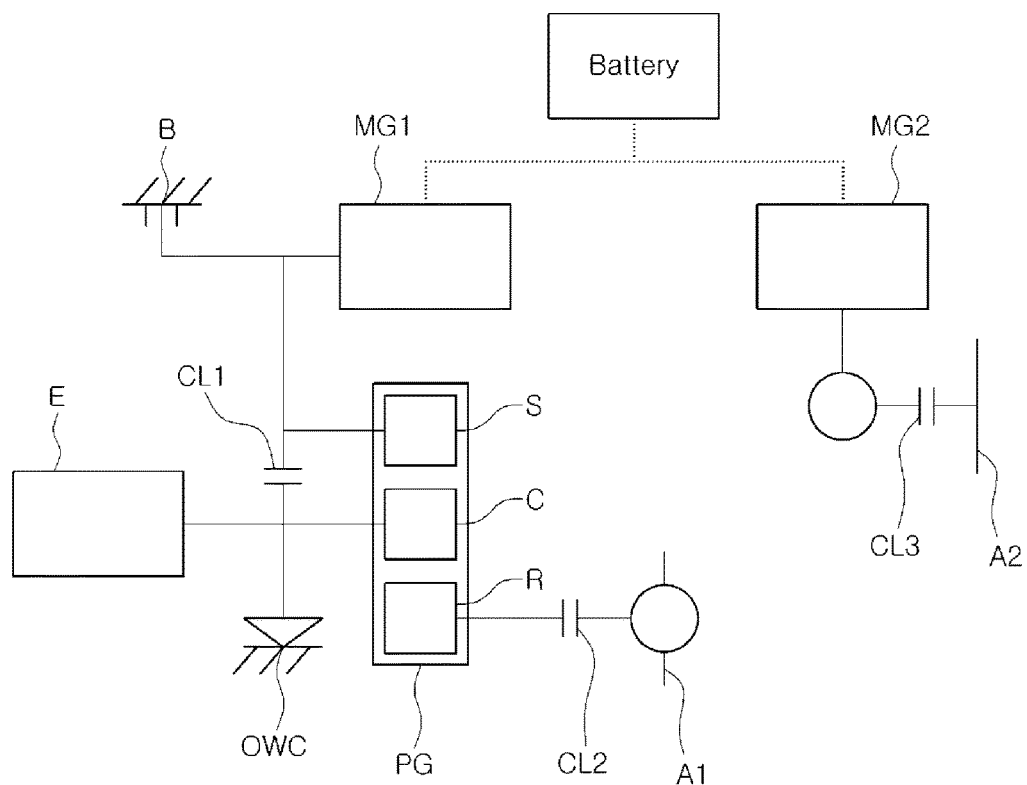
FIG. 1 is a diagram showing an exemplary powertrain of a hybrid vehicle according to the present invention.
Figure 2:
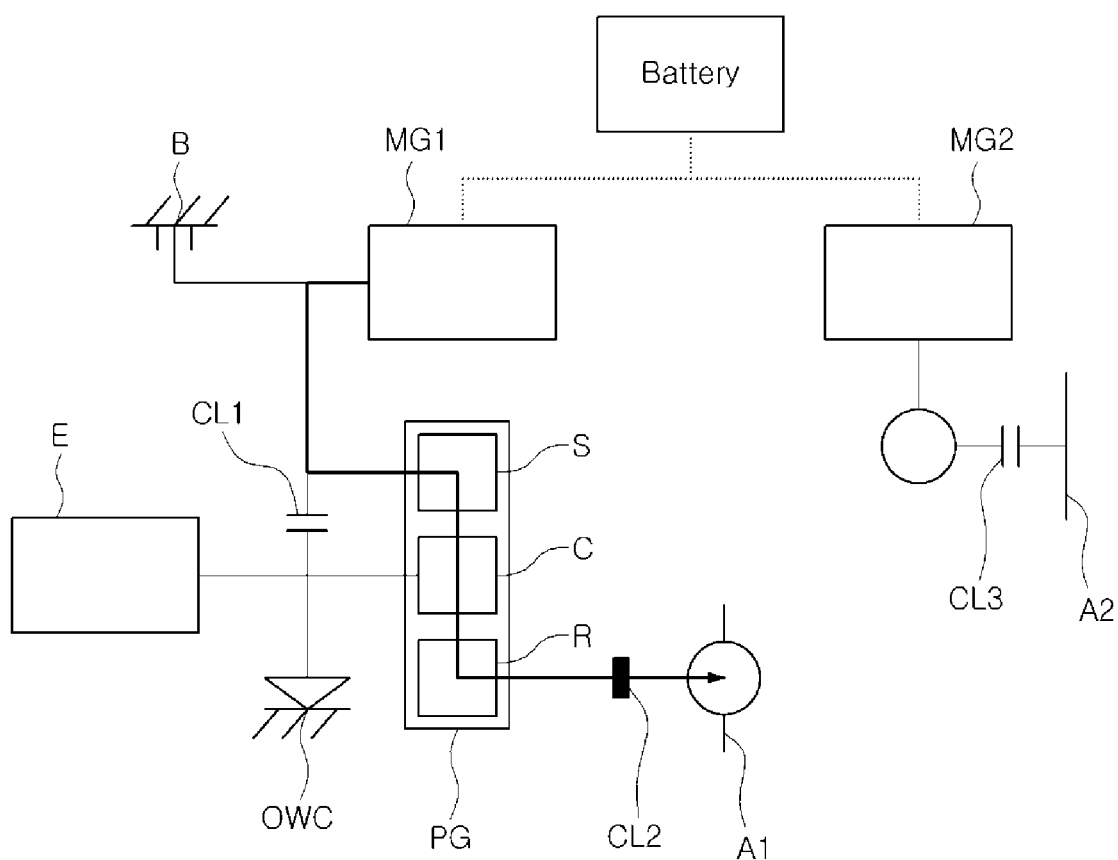
FIG. 2 is a diagram showing an EV 1 driving mode according to an exemplary powertrain of the present invention.
Figure 3:
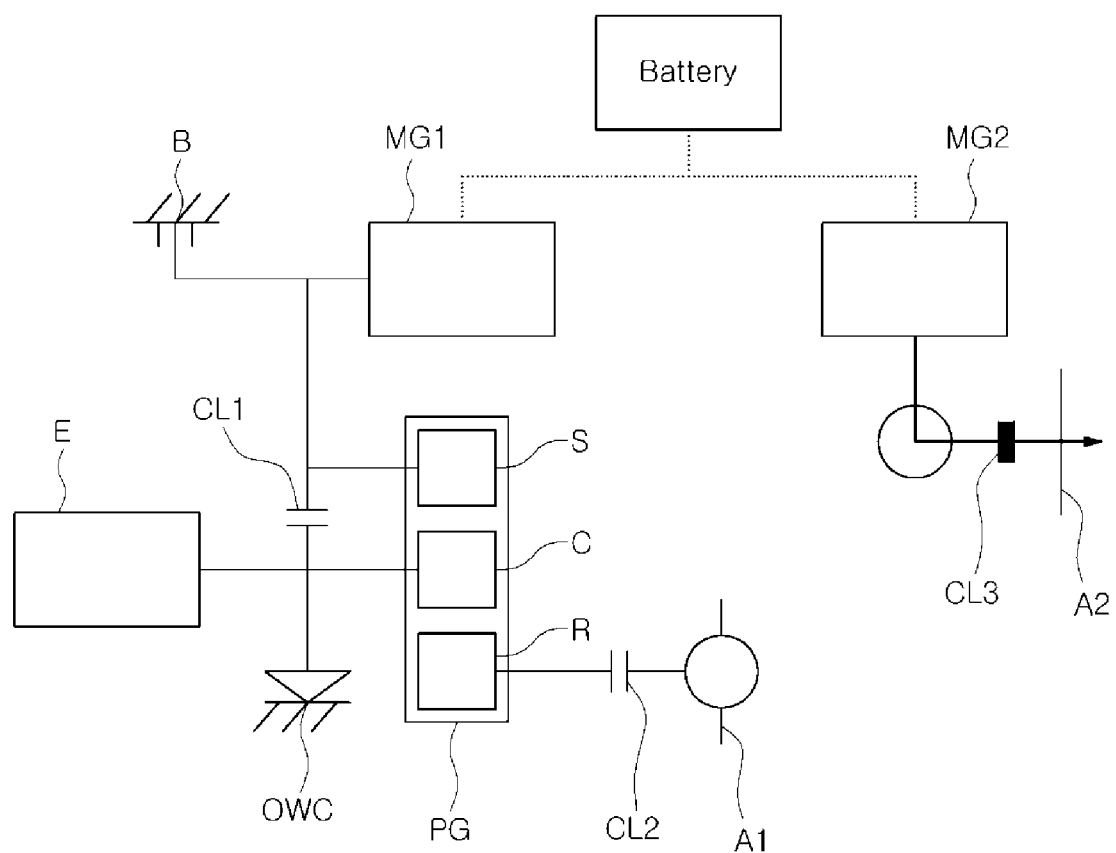
FIG. 3 is a diagram showing an EV 2 driving mode according to an exemplary powertrain of the present invention.
Figure 4:
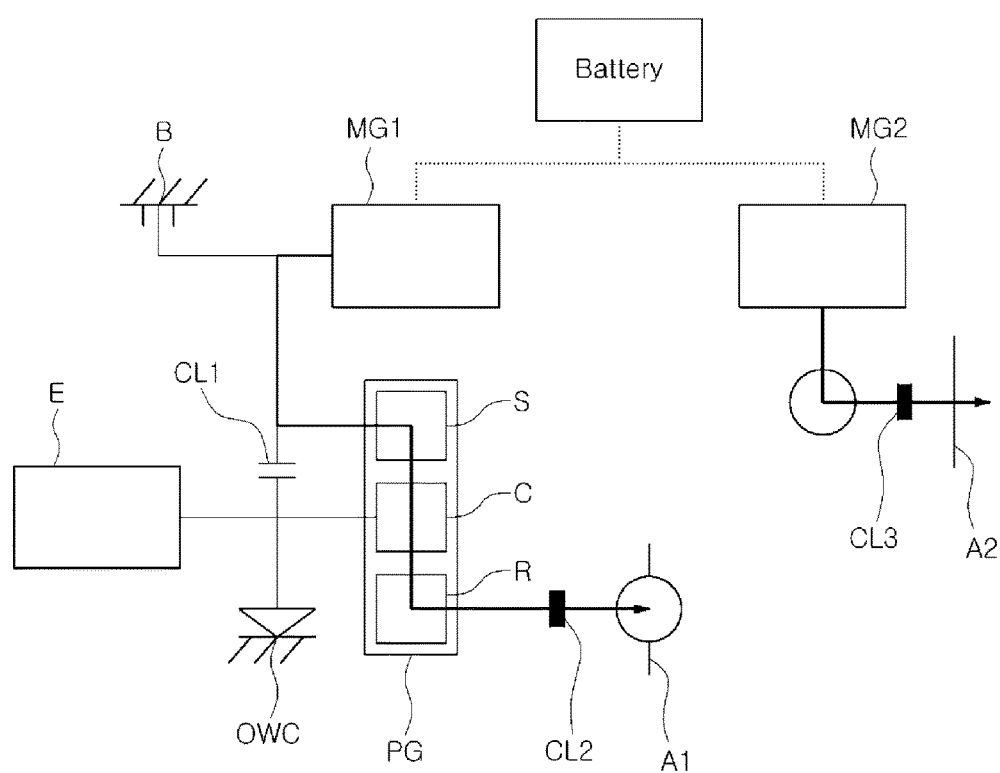
FIG. 4 is a diagram showing an EV 3 driving mode according to an exemplary powertrain of the present invention.
Figure 5:
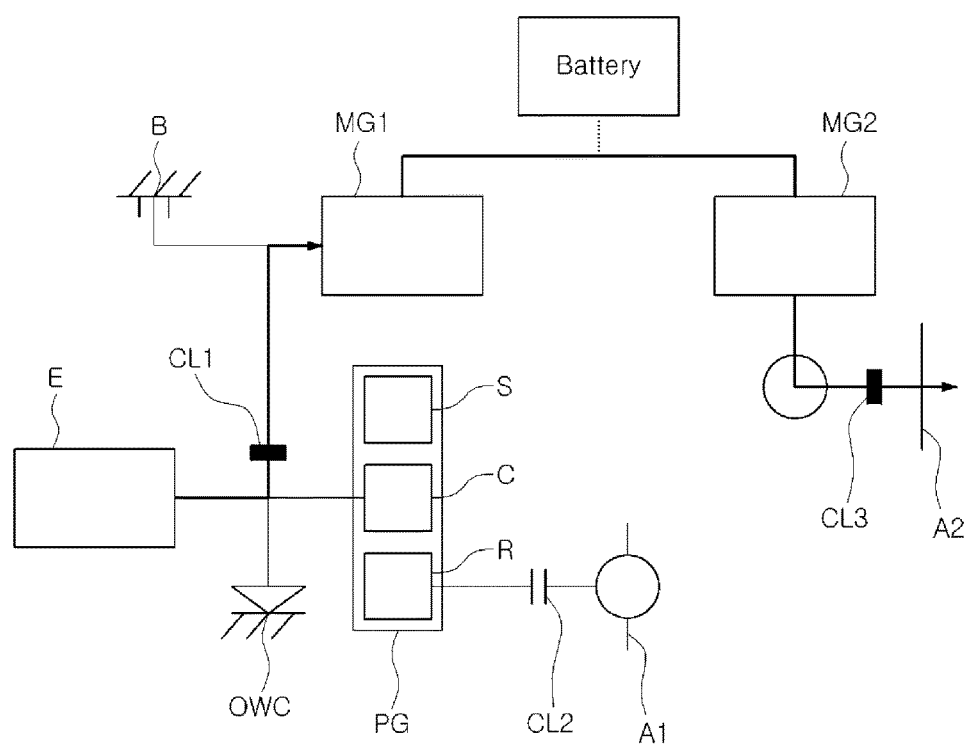
FIG. 5 is a diagram showing an HEV 1 driving mode according to an exemplary powertrain of the present invention.
Figure 6:
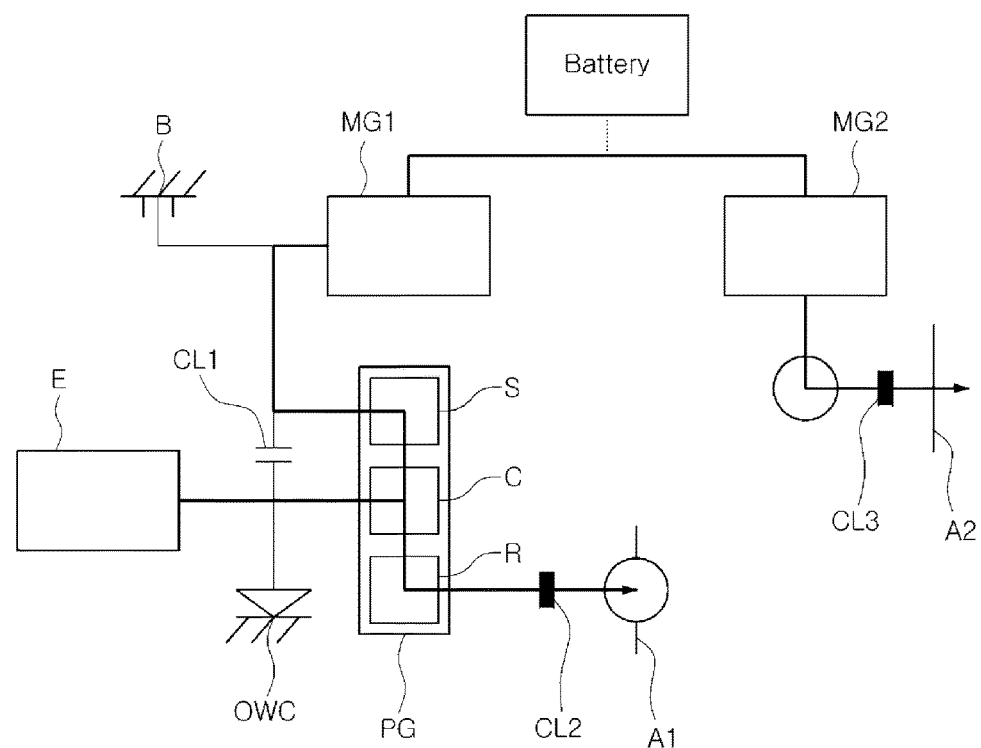
FIG. 6 is a diagram showing an HEV 2 driving mode according to an exemplary powertrain of the present invention.
Figure 7:
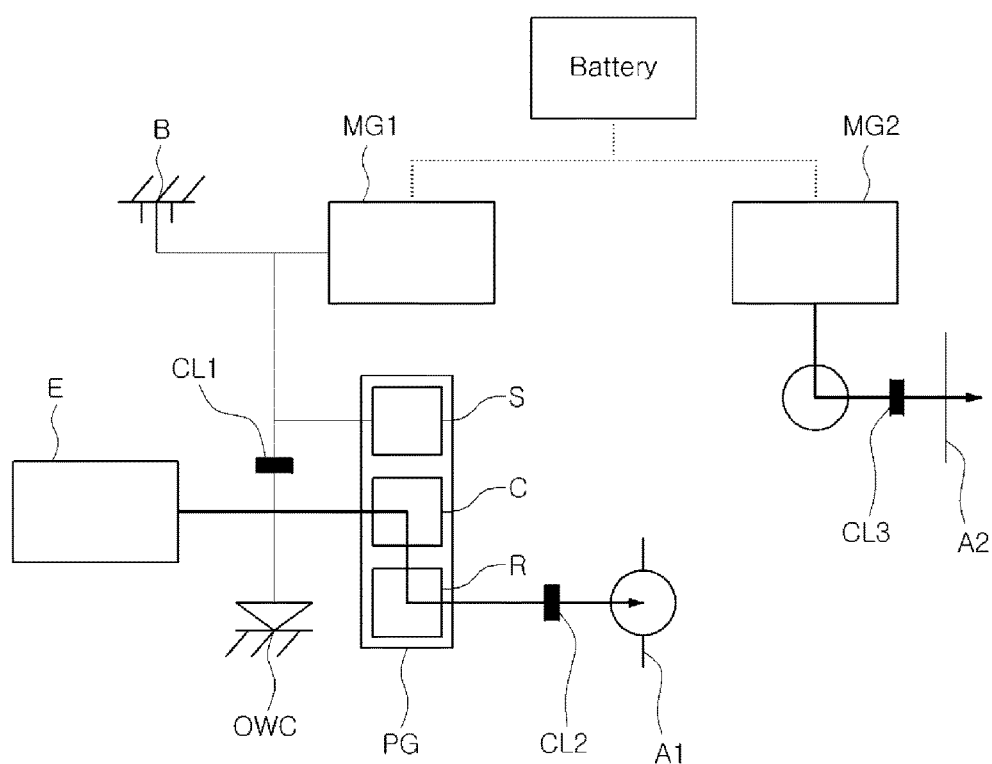
FIG. 7 is a diagram showing an HEV 3 driving mode according to an exemplary powertrain of the present invention.
Figure 8:
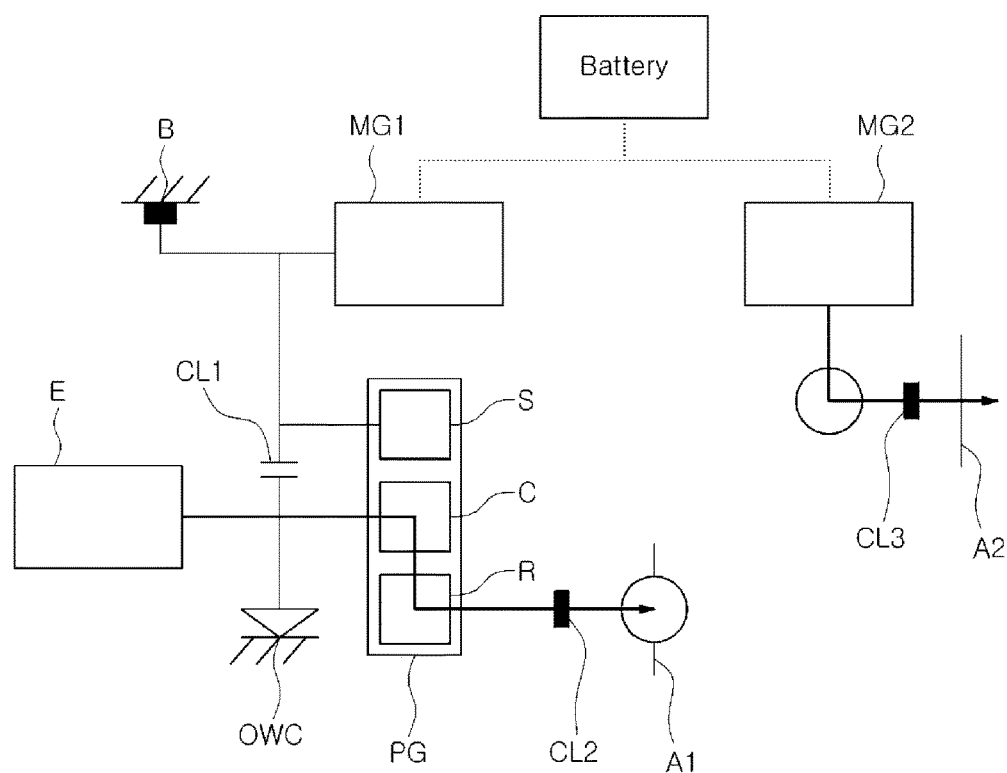
FIG. 8 is a diagram showing an HEV 4 driving mode according to an exemplary powertrain of the present invention.

FIG. 1 is a diagram showing a powertrain of a hybrid vehicle according to various embodiments of the present invention. FIG. 2 is a diagram showing an EV 1 driving mode, FIG. 3 is a diagram showing an EV 2 driving mode, and FIG. 4 is a diagram showing an EV 3 driving mode according to various embodiments of the present invention. FIG. 5 is a diagram showing an HEV 1 driving mode, FIG. 6 is a diagram showing an HEV 2 driving mode, FIG. 7 is a diagram showing an HEV 3 driving mode, and FIG. 8 is a diagram showing an HEV 4 driving mode according to various embodiments of the present invention.

A powertrain of a hybrid vehicle according to various embodiments, as shown in FIG. 1, includes: a planetary gear set PG including three rotary members in which any one of the three rotary members is connected to an engine E and any one of the other two rotary members is connected to a front driveshaft A1; a first motor unit MG1 connected to the remaining rotary member of the planetary gear set PG; and a second motor unit MG2 connected to a rear driveshaft A2 and supplying power to the rear driveshaft A2.

In the present invention, power from the engine E and the first motor unit MG1 may be transmitted to the front driveshaft A1 through the planetary gear set PG, and power from the second motor unit MG2 may be transmitted to the rear driveshaft A2 so that a vehicle can be driven by the front wheels, the rear wheels, or all the wheels in accordance with the driving conditions.

That is, the engine E and the first motor unit MG1 are connected to the front driveshaft A1 through the planetary gear set PG, so that the vehicle can be driven by the front wheels operated by the power from the engine E1 and the first motor unit MG1. The second motor unit MG2 is connected to the rear driveshaft A2, so that the vehicle can be driven by the rear wheels operated by the power from the second motor unit MG2.

Accordingly, it is possible to drive the vehicle with the front wheels or the rear wheels by controlling the engine E, the first motor unit MG1, and the second motor unit MG2 and four-wheel driving is also possible, so the vehicle can be driven in various ways according to various driving conditions.

The planetary gear set PG may be composed of a sun gear S, a carrier C, and a ring gear R. That is, the first motor unit MG1 may be connected to the sun gear S of the planetary gear set PG, the engine E may be connected to the carrier C, and the front driveshaft A1 may be connected to the ring gear R.

The planetary gear set PG can change and transmit torque from the engine E and the first motor unit MG1 in accordance with the gear ratio of the sun gear S, the carrier C, and the ring gear R and the gear ratio may be set to an appropriate value in accordance with the design.

The first motor unit MG1 and the second motor unit MG2 may be motor generators that provide power for driving a vehicle and can generate electricity.

The powertrain of a hybrid vehicle of the present invention can drive a vehicle in various driving modes including or consisting of: an EV 1 driving mode, an EV 2 driving mode, an EV 3 driving mode, an HEV 1 driving mode, and HEV 2 driving mode, an HEV 3 driving mode, and an HEV 4 driving mode To this end, in detail, the powertrain of the present invention further includes: a first clutch CL1 disposed between the rotary member connected to the first motor unit MG1 and the rotary member connected to the engine E, in the planetary gear set PG; and a second clutch CL2 disposed between the rotary member connected to the front driveshaft A1 in the planetary gear set PG and the front driveshaft A1.

That is, the first clutch CL1 is disposed between the sun gear S connected to the first motor unit MG1 and the carrier C connected to the engine E, in the planetary gear set PG, and selectively engages or disengages the sun gear S and the carrier C with/from each other, and the second clutch CL2 is disposed between the ring gear R of the planetary gear set PG and the front driveshaft A1 and selectively connects/disconnects the power from the engine E and the first motor unit MG1.

Operation of the first clutch CL1 and the second clutch CL2 is controlled by a controller and the controller for controlling various clutches of a powertrain of a hybrid vehicle may be the same or similar to those in the art, so it is not described herein.

As described herein, since the driving mode is changed in accordance with the engagement states between the first clutch CL1 and the second clutch CL2, various driving mode can be achieved.

As shown in FIG. 2, in the EV 1 driving mode, the first clutch CL1 is engaged, the second clutch CL2 is engaged, and the first motor unit MG1 is operated, so the vehicle can be driven by the front wheels operated by the power from the first motor unit MG1.

Alternatively, as shown in FIG. 3, in the EV 2 driving mode, the first clutch CL1 and the second clutch CL2 are disengaged and the second motor unit MG2 is operated, so the vehicle can be driven by the rear wheels operated by the power from the second motor unit MG2.

In the EV 1 driving mode, the power from the first driving mode MG1 is transmitted to the front driveshaft A1 by operating only the first motor unit MG1, disengaging the first clutch, and engaging the second clutch.

In the EV 2 driving mode, the power from the second motor unit MG2 is transmitted to the rear driveshaft A2 by disengaging the first clutch and the second clutch and operating only the second motor unit MG2. As the first clutch and the second clutch are disengaged, the driving force of the vehicle that is running is transmitted to the engine E and the first motor unit MG1 through the front driveshaft A1, so power is not lost.

The EV 1 driving mode and the EV 2 driving mode are suitable for starting and low-speed driving of the vehicle, respectively, and the vehicle can be driven selectively by the front wheels or rear wheels in accordance with the driving conditions.

FIG. 4 is a diagram showing the EV 3 driving mode. In the EV 3 driving mode, the first clutch CL1 is disengaged, the second clutch CL2 is engaged, and the first motor unit MG1 and the second motor unit MG2 are operated, so that the vehicle is driven by four wheels operated by the power from the first motor unit MG1 and the second motor unit MG2.

That is, the EV 1 driving mode and the EV 2 driving mode are both performed in the EV 3 driving mode, in which the power from the first motor unit MG1 is transmitted to the front driveshaft A1 and the power from the second motor unit MG2 is transmitted to the rear driveshaft A2, so that four-wheel driving in which the front wheels and the rear wheels of a vehicle are simultaneously operated is performed. This is suitable for high-speed driving in EV mode.

FIG. 5 is a diagram showing the HEV 1 driving mode. In the HEV 1 driving mode, the first clutch CL1 is engaged, the second clutch CL2 is disengaged, and the engine E is operated, so that the first motor unit MG1 generates electricity, using the power from the engine E and the second motor unit MG2 is operated, and accordingly, the rear wheels of the vehicle can be operated by the power from the second motor unit MG2.

That is, as the first clutch is engaged, the power from the engine E is transmitted to the first motor unit MG1, so that the RPMs of the engine E and the first motor unit MG1 are synchronized. Further, since the second clutch is disengaged, the power from the engine E is not transmitted to the front driveshaft A, so that the power from the engine E is transmitted only to the first motor unit MG1 and the vehicle is driven by the rear wheels operated by the second motor unit MG2.

As the power from the engine E is transmitted to the first motor unit MG1 and the first motor unit MG1 is operated by the engine E, so electricity can be generated.

In the HEV 1 driving mode, since the second motor unit MG2 is operated and the vehicle is driven by the rear wheels through the rear driveshaft A2, and a series type of hybrid mode in which the first motor unit MG1 generates electricity, using the power from the engine E and the vehicle is driven by the second motor unit MG2 is implemented.

FIG. 6 is a diagram showing the HEV 2 driving mode. In the HEV 2 driving mode, the first clutch CL1 is disengaged, the second clutch CL2 is engaged, and the engine E and the second motor unit MG2 are operated, so that the vehicle is driven by four wheels operated by the power from the engine E and the second motor unit MG2.

That is, as the first clutch is disengaged, the power from the engine E is not transmitted to the first motor unit MG1, while as the second clutch is engaged, the power from the engine E is transmitted to the front driveshaft A1 through the planetary gear set PG. Further, as the second motor unit MG2 is operated, the power from the second motor unit MG2 is transmitted to the rear driveshaft A2, so that the vehicle can be driven by four wheels in which the front wheels and the rear wheels are simultaneously operated.

In the HEV 2 driving mode, the first motor unit MG1 may also be operated, depending on the running state of the vehicle, in order that the power from the first motor unit MG1 is transmitted to the front driveshaft A1 together with the power from the engine E.

Accordingly, as the first motor unit MG1 is operated with the operation of the engine E, the front driveshaft A1 is rotated by appropriate level of power from the engine E and power from the first motor unit MG1. In particular, the power from the first motor unit MG1 and the power from the engine E change the number of revolutions in the planetary gear set PG, so it is possible to control the number of revolutions in the planetary gear set PG at an appropriate level in accordance with the operation state of the first motor unit MG1.

FIG. 7 is a diagram showing the HEV 3 driving mode. In the HEV 3 driving mode, the first clutch CL1 and the second clutch CL2 are engaged and the engine E and the second motor unit MG2 are operated, so that the vehicle can be driven by four wheels operated by the power from the engine E and the second motor unit MG2.

As the first clutch and the second clutch are engaged, the power from the engine E is transmitted to the planetary gear set PG and the first motor unit MG1, so that the number of revolutions of the engine E, the number of revolutions of the ring gear R of the planetary gear set PG, and the number of revolutions of the first motor unit MG1 become the same.

That is, as the engine E is operated with the first clutch and the second clutch engaged, the power from the engine E is transmitted to the front driveshaft A1 and the vehicle is driven. Further, power is also transmitted to the first motor unit MG1 and the first motor unit MG1 is operated, so that electricity is generated.

In this case, the power from the engine E is distributed to the first motor unit MG1 and the front driveshaft A1 and operates the second motor unit MG2 to rotate the rear driveshaft A2, so that four-wheel driving in which the front wheels and the rear wheels are simultaneously operated can be performed.

FIG. 8 is a diagram showing the HEV 4 driving mode. The HEV 4 driving mode is suitable for a vehicle running in an overdrive mode, and for this mode, a brake B selectively restricting the rotary member connected to the first motor unit MG1 in the planetary gear set PG is further provided.

That is, as the brake B is operated, the revolution of the first motor unit MG1 is restricted, so the power from the engine E is transmitted to the first motor unit MG1 and there is no loss of power due to the second motor unit MG2.

Accordingly, in the HEV 4 driving mode, the first clutch CL1 is disengaged, the second clutch CL2 and the brake B are engaged and operated, respectively, and the engine E and the second motor unit MG2 are operated, so that the vehicle can be driven by four wheels operated by the power from the engine E and the second motor unit MG2.

As described herein, as the first clutch is disengaged and the brake B is operated, the revolution of the first motor unit MG1 is restricted, while the second clutch is engaged, so the power from the engine E can be transmitted to the front driveshaft A1 without a loss due to the first motor unit MG1. Further, as the second motor unit MG2 is operated, the power from the second motor unit MG2 is transmitted to the rear driveshaft A2, so that the vehicle can be driven by four wheels in which the front wheels and the rear wheels are simultaneously operated. The HEV 4 driving mode is suitable for high-speed driving.

The first motor unit MG1 and the second motor unit MG2 can be independently controlled and their operation is adjusted in accordance with driving conditions in four-wheel driving so that the vehicle runs properly in accordance with the driving conditions.

On the other hand, a motor clutch CL3 may be disposed between the second motor unit MG2 and the rear driveshaft A2. The motor clutch CL3 can prevent a loss of power due to the second motor unit MG2 by disengaging, when the vehicle is driven by the front wheels in the various driving modes described herein.

When the vehicle is driven by the power from the second motor unit MG2, the vehicle can be driven by the rear wheels by engaging the motor clutch CL3 and a loss of inertia can be minimized by adjusting the engagement in accordance with the driving states.

A one-way clutch OWC may be disposed between the engine E and the planetary gear set PG. As the one-way clutch OWC is disposed between the engine E and the planetary gear set PG, the power from the engine E is transmitted to a driveshaft through the planetary gear set PG, whereas torque transmitted reversely to the engine E from the driveshaft can be blocked, so reverse revolution of the engine E can be prevented.

The powertrain of a hybrid vehicle of the present invention can provide various driving modes for driving a vehicle, so it enables a vehicle to run efficiently in accordance with various driving conditions.

In particular, a loss of power through the powertrain is minimized in front-wheel or rear-wheel driving by controlling a planetary gear set and a plurality of clutches and it is possible to achieve both an EV mode and regenerative braking, using all of the motors provided for the front wheels and the rear wheels, so that energy efficiency is high.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain of a hybrid vehicle, comprising:
   a planetary gear set including three rotary members in which one rotary member is connected to an engine and another rotary member is connected to a front driveshaft;
   a first motor unit connected to the remaining rotary member in the three rotary members;
   a second motor unit connected to a rear driveshaft and supplying power to the rear driveshaft;
   a first clutch disposed between the rotary member connected to the first motor unit and the rotary member connected to the engine, in the planetary gear set; and
   a second clutch disposed between the front drive shaft and the rotary member connected to the front driveshaft, in the planetary gear set,
   wherein a driving mode changes in accordance with engagement states of the first clutch and the second clutch.

2. The powertrain of claim 1, wherein the planetary gear set includes a sun gear, a carrier, and a ring gear.

3. The powertrain of claim 2, wherein the first motor unit is connected to the sun gear of the planetary gear set, the engine is connected to the carrier, and the front driveshaft is connected to the ring gear.

4. The powertrain of claim 1, wherein in an EV 1 driving mode, the first clutch is disengaged, the second clutch is engaged, and the first motor unit is operated, so that the vehicle is driven by front wheels operated by power from the first motor unit.

5. The powertrain of claim 1, wherein in an EV 2 driving mode, the first clutch and the second clutch are disengaged and the second motor unit is operated, so that the vehicle is driven by rear wheels operated by power from the second motor unit.

6. The powertrain of claim 1, wherein in an EV 3 driving mode, the first clutch is disengaged, the second clutch is engaged, and the first motor unit and the second motor unit are operated, so that the vehicle is driven by four wheels operated by power from the first motor unit and the second motor unit.

7. The powertrain of claim 1, wherein in an HEV 1 driving mode, the first clutch is engaged, the second clutch is disengaged, and the engine is operated, so that the first motor unit generates electricity, using power from the engine, the second motor unit is operated, and the vehicle is driven by rear wheels operated by power from the second motor unit.

8. The powertrain of claim 1, wherein in an HEV 2 driving mode, the first clutch is disengaged, the second clutch is engaged, and the engine and the second motor unit are operated, so that the vehicle is driven by four wheels operated by power from the engine and the second motor unit.

9. The powertrain of claim 8, wherein in the HEV 2 driving mode, the first motor unit is operated in accordance with a driving state of the vehicle, so that power from the first motor unit is transmitted to the front driveshaft together with power from the engine.

10. The powertrain of claim 1, wherein in an HEV 3 driving mode, the first clutch and the second clutch are engaged, and the engine and the second motor unit are operated, so that the vehicle is driven by four wheels operated by power from the engine and the second motor unit.

11. The powertrain of claim 1, further comprising:
a brake selectively restricting the rotary member connected to the first motor unit, in the planetary gear set,
wherein in an HEV 4 driving mode, the first clutch is disengaged, the second clutch and the brake are engaged and operated, respectively, and the engine and the second motor unit are operated, so that the vehicle is driven by four wheels operated by power from the engine and the second motor unit.

12. The powertrain of claim 1, wherein a motor clutch is disposed between the second motor unit and the rear driveshaft.

13. The powertrain of claim 1, wherein a one-way clutch is disposed between the engine and the planetary gear set.

* * * * *